Oct. 12, 1937.  S. E. SHEPPARD ET AL  2,095,839
PHOTOTHERMOGRAPHIC COMPOSITION
Filed Sept. 27, 1935
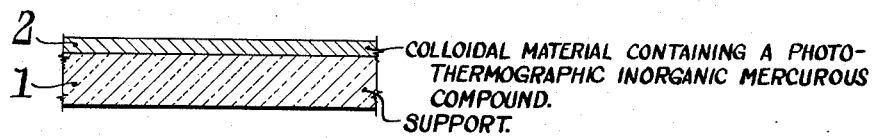
INVENTORS:
Samuel E. Sheppard & Waldemar Vanselow,
BY
ATTORNEYS.

Patented Oct. 12, 1937

2,095,839

UNITED STATES PATENT OFFICE 2,095,839

PHOTOTHERMOGRAPHIC COMPOSITION

Samuel E. Sheppard and Waldemar Vanselow, Rochester, N. Y., assignors, by mesne assignments, to Eastman Kodak Company, Jersey City, N. J., a corporation of New Jersey Application September 27, 1935, Serial No. 42,394

8 Claims. (Cl. 95—6)

This invention relates to photographic elements and particularly to such elements sensitized with compounds which, after exposure to light, are developable by heat.

Material of the type which, after it is exposed to light, may be decomposed or modified by the action of heat differentially in accordance with the exposure is termed "photothermographic" material. Material of this type is described in our prior U. S. Patent No. 1,976,302 and in our Patent No. 2,019,737. When such material is exposed to light, the sensitive material is affected and nuclei are formed which catalyze the thermal decomposition of the material. This preliminary exposure to light may be of very short duration or considerable time may be required to form the catalyzing nuclei. Usually no visible effect is produced by this exposure, although if the exposure to light is prolonged, a visible image may be produced. The subsequent exposure to heat produces an image which may be a visible image, a relief image, or an image which is distinguished from the background by a difference in details of structure, such as granularity. The light which is used to form the catalyzing nuclei may be visible light, or ultra-violet light although, in certain cases radiant energy in the form of X-rays may be used to produce these nuclei.

We have found inorganic mercurous salts to be particularly useful in forming photothermographic compositions. Not all inorganic mercurous compounds are operative for this purpose, but after extensive investigations we have discovered that the following mercurous compounds function as photothermographic compounds:

azide
bromide
carbonate
chloride
chloride hydrazine
chromate
iodide
molybdate
phosphate
sulfate
thiocyanate
tungstate The single figure of the accompanying drawing is a sectional view of a photographic element sensitized with an inorganic mercurous salt according to our invention.

The methods of preparation of sensitive compounds of these materials will now be described.

In the preparation of most of these inorganic mercurous salts, an aqueous mercurous nitrate-nitric acid solution was used. This solution was prepared as follows: A solution was made up by mixing 10 grams of mercurous nitrate ($HgNO_3.2H_2O$) with 1.5 cc. of concentrated nitric acid (specific gravity 1.42) in 15 cc. of water. This was heated gently until solution took place. This solution may be further diluted with water.

*Mercurous azide.*—This compound was made by adding a solution of 250 cc. of the mercurous nitrate-nitric acid solution containing 26.3 grams of mercurous nitrate to 250 cc. of 2% gelatin solution containing 11.4 grams (approximately 100% excess) of sodium azide. The mercurous azide was washed with a 1% gelatin solution and centrifuged. After this washing it was dispersed in 300 cc. of 8% gelatin. About 17 or 18 cc. of this emulsion were coated on a 4¼" x 6½" plate. This plate was permitted to dry in the dark at room temperature.

*Mercurous bromide.*—This compound is white and was obtained by adding the mercurous nitrate-nitric acid to a solution of potassium bromide containing 100% excess bromide. It was washed free from acid by decantation with water and was then dispersed in gelatin and coated on a plate in the manner described for the azide.

*Mercurous carbonate.*—This compound is yellow in color and was prepared by adding the mercurous nitrate-nitric acid solution to a solution of sodium bicarbonate containing 100% excess bicarbonate. The mercurous carbonate thus formed was washed in water and then in acetone and was suspended in a phenol formaldehyde lacquer and coated onto glass plates.

*Mercurous chloride.*—This compound is white in color and was prepared by adding the mercurous nitrate-nitric acid solution to a solution of potassium chloride containing 100% excess chloride. It was washed free from acid by decantation with water and was then dispersed in gelatin and coated in the manner described for the azide.

*Mercurous chloride hydrazine $HgCl(NH_2)_2$.*—This compound is gray in color and was obtained by first preparing the mercurous chloride as described above. This was washed free from acid and a solution of 20 grams of hydrazine sulfate in 250 cc. of water was added to the mercurous chloride and the mixture stirred for about an hour. It was permitted to stand overnight and was then centrifuged and washed once with water. The compound was then dispersed in gelatin and coated as in the case of the chloride.

*Mercurous chromate.*—This compound is red in color and was obtained by adding the solution of mercurous nitrate and nitric acid to an aqueous solution of potassium chromate containing 50% excess chromate. It was centrifuged and washed twice with water and was then dispersed in gelatin and coated as in the case of the azide.

*Mercurous iodide.*—This compound is yellow in color and was obtained by adding 12 grams of potassium iodide in 25 cc. of water, drop by drop, to an aqueous solution of 500 cc. containing 31 grams of mercurous nitrate and 5 grams of concentrated nitric acid. It was allowed to stand 24 hours and was then decanted and washed. The use of alcohol is to be avoided in the preparation of this compound because it aids in the decomposition of the mercurous iodide. The iodide was then dispersed in gelatin and coated as in the case of the chloride.

*Mercurous molybdate.*—This compound is yellow and was prepared by adding the aqueous solution of mercurous nitrate-nitric acid to an acid solution of molybdenum trioxide containing 100% excess trioxide. This compound was then dispersed in gelatin and coated as in the case of the other compounds.

*Mercurous phosphate.*—This compound is pale gray in color and turns yellow on heating gently. It was obtained by adding the aqueous mercurous nitrate-nitric acid solution to a solution of sodium phosphate containing about 80% excess phosphate. The compound was centrifuged and washed twice with water and was then dispersed in gelatin and coated as in the case of the other compounds.

*Mercurous sulfate.*—This compound is white with a slight grayish tinge and was prepared by the method used in preparing the phosphate except that potassium sulfate was used instead of sodium phosphate.

*Mercurous thiocyanate.*—This compound is a very pale gray color and was prepared by adding the mercurous nitrate-nitric acid solution to a solution of potassium thiocyanate containing 100% excess thiocyanate. It was washed in water and then in acetone and was suspended in a phenol-formaldehyde lacquer and coated on glass plates.

*Mercurous tungstate.*—This compound is orange and was prepared by adding the mercurous nitrate-nitric acid solution to a solution of sodium tungstate containing about 80% excess tungstate. The compound was centrifuged and washed twice with water, after which it was dispersed in gelatin and coated on a glass plate.

The method of testing the finished dried plates for photothermographic properties consisted in exposing them for a known period of time at a distance of 60 centimeters to the complete emission spectrum of the Cooper-Hewitt quartz mercury vapor art having a drop of potential of approximately 105 volts across its terminals. These exposures were followed by heating the plates to a known temperature of a heated surface.

The length of time necessary to form the catalyzing nuclei varies with the different compounds. The following table gives the time of exposure required to form such nuclei for the various compounds. Where no time is given, the exposure required has not been measured.

| | |
|---|---|
| Azide | 1 sec. |
| Bromide | 50 sec. |
| Carbonate | 25 sec. |
| Chloride | 5 sec. |
| Chloride hydrazine | ⅓ sec. |
| Chromate | 30 min. |
| Iodide | 5 sec. |
| Molybdate | (no data) |
| Phosphate | 1 sec. |
| Sulfate | 10 sec. |
| Thiocyanate | 60 sec. |
| Tungstate | 30 min. |

After exposure to the light, the plates were heated as follows to give a visible image. The azide, bromide, chloride, chloride hydrazine, iodide, molybdate, sulfate, and thiocyanate were heated to 120° C. for about four or five minutes. The carbonate, chromate, phosphate, and tungstate were heated over a Bunsen burner flame for about one minute, after which photothermographic properties were exhibited.

In the accompanying drawing, we have shown a view in section of a photographic element comprising a support 1 which may be of glass or other material, which is not necessarily transparent, having a sensitive layer 2 comprising a colloidal material such as gelatin in which is dispersed one of the heat-sensitive salts mentioned.

In the above specific examples we have referred to the use of gelatin and phenol-formaldehyde lacquer as the colloidal materials used to disperse the heat-sensitive compounds. Other colloidal materials may be used for this purpose, such as casein, agar, albumen, cellulosic materials such as cellulose esters and ethers and regenerated cellulose, and other resins such as the polymerized vinyl acetate resins and the glyceryl phthalate resins.

In addition to glass as a support, other materials may be used, such as paper, cellulose derivatives, and any of the resins described above. The selection of the material for the sensitive salt, dispersing medium and the support will be governed by the sensitive material to be dispersed and by the temperature to which the plate or support is to be subjected.

While the salts described are sensitive to ultra-violet light, they are also somewhat sensitive to visible light.

What we claim is:

1. A photographic element comprising a support and a heat sensitive layer thereon, the heat sensitive layer comprising a colloid carrier and a heat sensitive material therein, the heat sensitive material being a mercurous salt selected from the group consisting of: azide, bromide, chloride, chloride hydrazine, iodide, molybdate, sulfate, and thiocyanate.

2. A photographic material comprising a colloid carrier and a heat sensitive material therein, the heat sensitive material being mercurous azide.

3. A photographic material comprising a colloid carrier and a heat sensitive material therein, the heat sensitive material being mercurous thiocyanate.

4. A photographic material comprising a colloid carrier and a heat sensitive material therein, the heat sensitive material being mercurous chloride hydrazine.

5. A photographic material comprising a support and a heat sensitive layer thereon, the heat sensitive layer comprising a colloid carrier and mercurous azide.

6. A photographic element comprising a support and a heat sensitive layer thereon, the heat sensitive layer comprising a colloid carrier and mercurous thiocyanate.

7. A photographic element comprising a support and a heat sensitive layer thereon, the heat sensitive layer comprising a colloid carrier and mercurous chloride hydrazine.

8. The method of forming a visible image in a photothermographic layer which comprises exposing to ultra-violet light a colloid layer having therein a mercurous salt selected from the group consisting of azide, bromide, carbonate, chloride, chloride hydrazine, chromate, iodide, molybdate, phosphate, sulfate, thiocyanate, and tungstate, and then heating the layer to a temperature sufficient to form a visible image therein.

SAMUEL E. SHEPPARD.
WALDEMAR VANSELOW.